US009560062B2

(12) United States Patent
Khatri et al.

(10) Patent No.: US 9,560,062 B2
(45) Date of Patent: Jan. 31, 2017

(54) SYSTEM AND METHOD FOR TAMPER RESISTANT RELIABLE LOGGING OF NETWORK TRAFFIC

(71) Applicant: Dell Products, LP, Round Rock, TX (US)

(72) Inventors: Mukund P. Khatri, Austin, TX (US); Theodore S. Webb, Austin, TX (US); Jacqueline H. Wilson, Austin, TX (US); Jon R. Ramsey, Atlanta, GA (US)

(73) Assignee: SECUREWORKS CORP., Wilmington, DE (US)

( * ) Notice: Subject to any disclaimer, the term of this patent is extended or adjusted under 35 U.S.C. 154(b) by 0 days.

(21) Appl. No.: 14/095,783

(22) Filed: Dec. 3, 2013

(65) Prior Publication Data

US 2015/0156212 A1 Jun. 4, 2015

(51) Int. Cl.
*H04L 29/06* (2006.01)

(52) U.S. Cl.
CPC ....... *H04L 63/1425* (2013.01); *H04L 63/1416* (2013.01)

(58) Field of Classification Search
USPC ...................... 726/22–23; 370/252
See application file for complete search history.

(56) References Cited

U.S. PATENT DOCUMENTS

| 8,458,791 | B2 | 6/2013 | Do et al. |
| 2005/0020148 | A1* | 1/2005 | Peng ............... H01R 13/6658 439/894 |
| 2008/0127335 | A1* | 5/2008 | Khan et al. ............ 726/22 |
| 2009/0041004 | A1* | 2/2009 | Emmanuel ....... H04L 12/40045 370/352 |
| 2009/0238088 | A1* | 9/2009 | Tan ............................ 370/252 |
| 2010/0057982 | A1 | 3/2010 | Barde |
| 2012/0023579 | A1* | 1/2012 | Zaitsev et al. .............. 726/23 |
| 2012/0047576 | A1 | 2/2012 | Do et al. |

* cited by examiner

*Primary Examiner* — Amir Mehrmanesh
(74) *Attorney, Agent, or Firm* — Larson Newman, LLP

(57) ABSTRACT

A network interface device includes a memory and a processor operable to receive a malicious packet marker, store the malicious packet marker to the memory, monitor network data packets flowing in the network interface device, determine that a packet matches the malicious packet marker, and store log information from the packet to the memory.

17 Claims, 5 Drawing Sheets

SYSTEM AND METHOD FOR TAMPER RESISTANT RELIABLE LOGGING OF NETWORK TRAFFIC

FIELD OF THE DISCLOSURE

This disclosure relates generally information handling systems, and more particularly relates to a system and method for secure remote diagnostics in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system can perform various logging functions to track the operating status of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
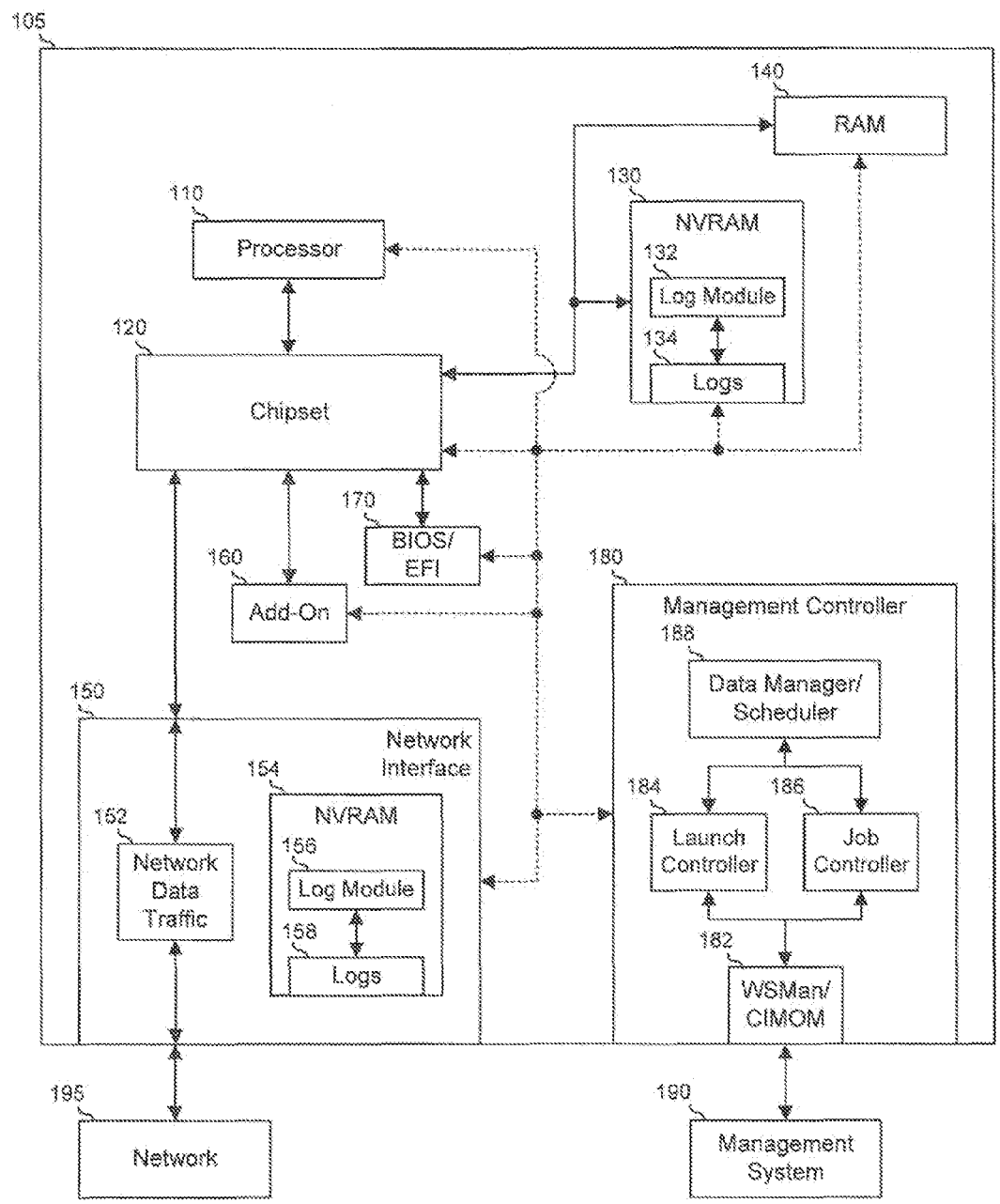
FIG. 1 is a block diagram illustrating a managed system according to an embodiment of the present disclosure.

FIG. 1 illustrates an embodiment of a managed network 100 including a managed system 105, a management system 190, and a network 195. Managed system 105 is an embodiment of an information handling system that includes a processor 110, a chipset 120, a system non-volatile random access memory (NVRAM) 130, a system RAM 140, a network interface card (NIC) 150, an add-on resource 160, a basic input/output system/extensible firmware interface (BIOS/EFI) module 170, and a management controller (MC) 180. NVRAM 130 represents one or more non-volatile memory devices for providing permanent re-writable memory for managed system 105 and for MC 180. In a particular embodiment, NVRAM 130 represents a secure data storage resource, such as a managed storage and repository (MASER) on an embedded multi-media card (eMMC), and includes data storage and code that can be executed by the processor 110 or by MC 180.

NVRAM 130 includes a data partition for the secure and hidden storage of a log module 132 for tracking and monitoring the operating status of the elements of managed system 105. Log module 132 saves the log information 134 to a predefined or user-defined storage location such as a hidden partition of NVRAM 130. In this way, log information 134 is securely maintained such that the log information is resistant to tampering or manipulation by malicious programs or users. In a particular embodiment, log module 132 is isolated from an operating system running on managed system 105 and from programs running on the operating system. An example of log module 132 includes BIOS/EFI logging functions, a logging and status monitoring portion of an operating system running on managed system 105, program logs for one or more programs running on the operating system, network traffic logs for data packets sent and received by NIC 150, such as source and destination Internet Protocol (IP) addresses, port number, packet protocol, a representation of the contents of a packet, such as a log of a number of characters of a payload of the packet or a hash of the payload, other network traffic information, or the like, hardware logs for add-on resource 160, another logging function, or a combination thereof. In a particular embodiment, log information 134 includes compressed log information. In another embodiment, log information 134 is encrypted onto NVRAM 130 to further improve the security and tamper resistance of the log information.

NIC 150 includes a network data traffic path 152 and an NVRAM 154. Network data traffic path 152 provides the network functionality of NIC 150, including receiving information from chipset 120 in a first protocol of an internal interface of managed system 105, packetizing the information for transmission onto network 195, and translating the packetized information into a protocol of the network. For example, network data traffic path 152 can receive information from chipset 120 in accordance with a PCIe data protocol, can provide source and destination IP addresses to an IP header that is added to the information, can provide source and destination Media Access Control (MAC) addresses to an Ethernet header that is added to the information, and can transmit the packetized information to network 195. The network functionality of NIC 150 also includes receiving packets from network 195, removing header information from the packets, and sending the information to chipset 120. NVRAM 154 includes code for controlling NIC 150. As such, NIC 150 includes a processor that can execute the code included in NVRAM 154 to control the NIC. For example, where NIC 150 provides port virtualization and virtual LAN (vLAN) capabilities, NVRAM 154 can include port mappings for routing v-port and vLAN packets to associated virtual machines or applications running on managed system 105.

NVRAM 154 also includes a log module 156 for tracking and monitoring the operating status of network data traffic path 152. Log module 158 provides log information 158 based upon the tracking and monitoring operations of log module 156, including network traffic logs for data packets sent and received by NIC 150, such as source and destination Internet Protocol (IP) addresses, port number, packet protocol, a representation of the contents of a packet, such as a log of a number of characters of a payload of the packet or a hash of the payload, other network traffic information, or the like.

Figure 2:
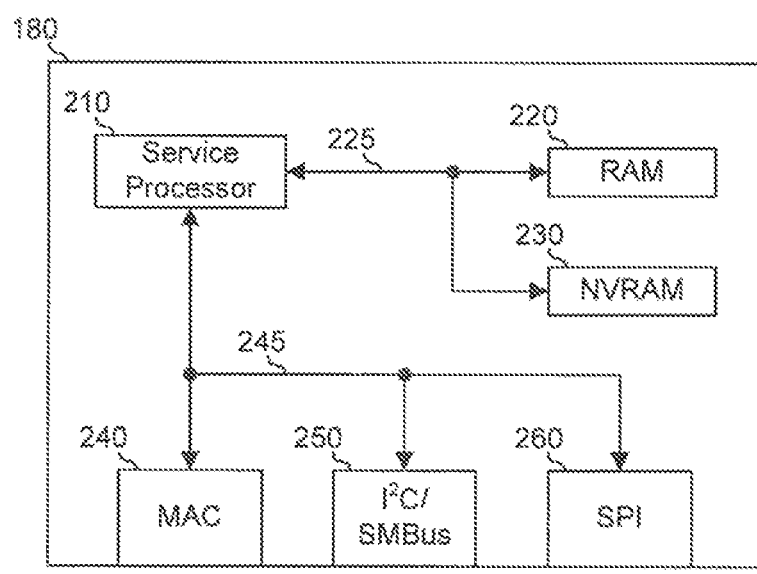
FIG. 2 is a block diagram illustrating an embodiment of a management controller of the managed system of FIG. 1.

MC 180 is connected to processor 110, chipset 120, NVRAM 130, RAM 140, NIC 150, add-on resource 160, BIOS/EFI module 170, and management system 190. FIG. 2 illustrates an embodiment of MC 180 including a service processor 210, a random-access memory (RAM) 220, an NVRAM 230, a media access control interface (MAC) 240, an I²C/SMBus interface 250, and an SPI interface 260. RAM 220 and NVRAM 230 are connected to service processor 210 through a memory bus 225. MAC 240, I²C/SMBus interface 250, and SPI interface 260 are connected to service processor 210 through an I/O bus 245. MC 180 functions as a separate microcontroller in managed system 105, providing a dedicated management channel for maintenance and control of resources in the managed system. As such, the resources in managed system 105 are connected to one or more of I²C/SMBus interface 250, and SPI interface 260, permitting MC 180 to receive information from or send information to the resources. Management system 190 is connected to MC 180 via MAC 240, thereby permitting MC 180 to receive information from or send information to the management system for out-of-band management of managed system 105. An example of MAC 240 includes an Ethernet standard interface, such as a reduced media independent interface (RMII), a network communication service interface (NC-SI), another network standard interface, or any combination thereof.

In a particular embodiment, MC 180 is included on a main circuit board (e.g., a baseboard, a motherboard, or any combination thereof) of managed system 105, integrated onto another element of the managed system such as chipset 120, or another suitable element, as needed or desired. As such, MC 180 can be part of an integrated circuit or a chip set within managed system 105. An example of MC 180 includes a baseboard management controller (BMC), an integrated Dell remote access controller (iDRAC), another controller, or any combination thereof. MC 180 can also operate on a separate power plane from other resources in managed system 105. Thus MC 180 can communicate with management system 190 while the resources of managed system 105 are powered off. In this way, information is sent from management system 190 to MC 180 and the information is stored in RAM 220 or NVRAM 230. Information stored in RAM 220 may be lost after power-down of the power plane for MC 180, while information stored in NVRAM 230 may be saved through a power-down/power-up cycle of the power plane for the MC.

MC 180 includes a web services manager/common information model object manager (WSMan/CIMOM) module 182, a launch controller module 184, and job controller module 186, and a data manager/scheduler module 188. WSMan/CIMOM module 182 operates to provide a web based service interface between MC 180 and management system 190, and a consistent management interface to the management system for managing the elements of managed system 105. WSMan/CIMOM module 182 permits an operator of management system 190 to send commands, either manually or via a command script, to MC 180 to send or receive information from the elements of managed system 105, and to perform processing tasks on the managed system. An example of WSMan/CIMOM module 182 includes a Dell remote access controller administrator (RA-CADM). WSMan/CIMOM module 182 interacts with launch controller module 184 and job controller module 186 to launch and manage the requests for information from the elements of managed system 105 and to set up the processing tasks for execution on the managed system. An example of a launch controller module includes a Dell Lifecycle controller included in a Dell iDRAC. Data manager/scheduler module 188 operates to manage the flow of information between the elements of managed system 105 and MC 180, and to schedule the execution of the processing tasks on the managed system.

In a particular embodiment, MC 180 operates to remotely launch log module 132, to obtain log information 134 from managed system 105, and to provide the results to management system 190. Here, management system 190 operates to provide a job entry to WSMan/CIMOM module 182. The job entry includes one or more log functions to be performed by log module 132, each represented as command line commands that are executable by the log module, times at which each associated log function is to be run, a location for providing log information 134 or direction to return the results to management system 190, and other information as needed or desired to implement the execution of the log functions. WSMan/CIMOM module 182 provides the job entry to launch controller 184 to create an associated log function job that is provided to job controller 186. Job controller 186 operates to receive the log function job, and works with data manager/scheduler 188 to launch the log function job on managed system 105, as described further below, to obtain log information 134, and to cancel the log function job in response to an error or to the completion of the log function job. Job controller 186 returns log information 134 to launch controller 184 which exports the log information to management system 190.

In a particular embodiment, log module 130 operates to monitor the network traffic flowing in network data traffic path 152 to detect malicious data packets, such packets that are associated with known malicious IP addresses, malicious MAC addresses, that include suspicious port accesses, or that include malicious code, such as viruses, worms, Trojans, and the like. As such, log module 132 operates to receive information from NIC 150 regarding the network traffic flows, and records the information in logs 134 such that MC 180 can retrieve the information and provide it to management system 190. In the alternative, MC 180 can provide log module 132 with a list of malicious packet markers, such as malicious IP addresses, malicious MAC addresses, suspected suspicious port accesses, tags that indicate the presence of malicious code, or the like. Here, log module 132 provides the list of malicious packet markers to NIC 150, and the NIC performs the monitoring and provides information back to the log module only when the NIC detects suspicious activity.

Figure 3:
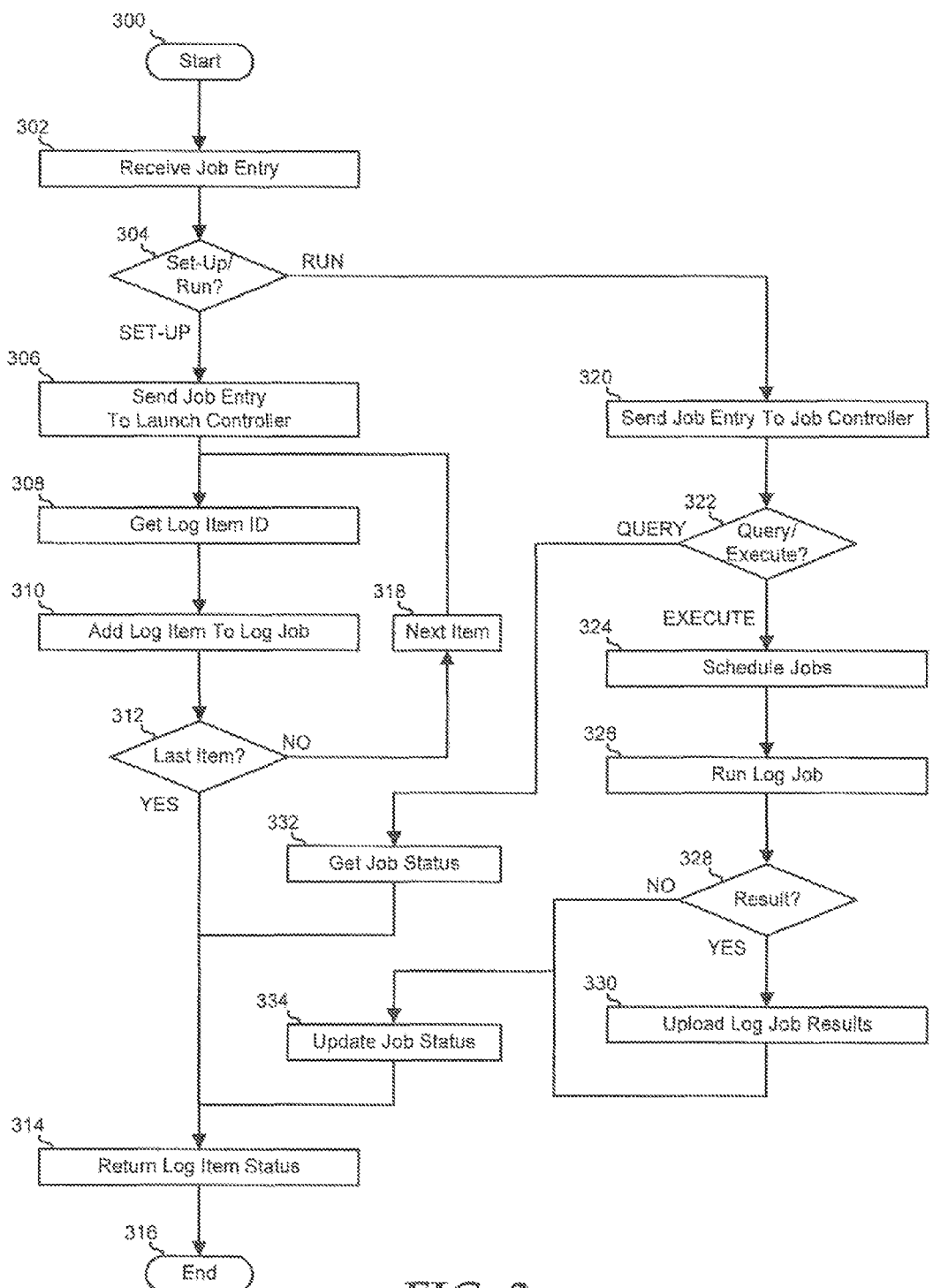
FIGS. 3 and 4 are flowcharts illustrating methods for tamper resistant reliable logging of network traffic in a managed system.

FIG. 3 illustrates a method for tamper resistant reliable logging of network traffic in a managed system starting at block 300. A job entry is received at block 302. For example, management system 190 can send a job entry to WSMan/CIMOM module 182. A decision is made as to whether the job entry is a set-up entry or a run entry in decision block 304. If the job entry is a set-up entry, the "SET-UP" branch of decision block 304 is taken and the job entry is sent to a launch controller in block 306. For example, WSMan/CIMOM module 182 can send a job entry to launch controller 184. The launch controller determines a log item identifier in block 308 and adds the log identifier to a logging job in block 310. A decision is made as to whether or not the log task is the last task in the logging job entry in decision block 312. If not, the "NO" branch of decision block 312 is taken, a next log task is selected in block 318, and the method returns to block 308 where the launch controller determines a log item identifier for the next task. If the task is the last task in the job entry, the "YES" branch of decision block 312 is taken, the launch controller returns log item status in block 314, and the method ends in block 316.

Returning to decision block 304, if the job entry is a run entry, the "RUN" branch is taken and the job entry is sent to a job controller in block 320. For example, WSMan/CIMOM module 182 can send a job entry to job controller 186. A decision is made as to whether the job entry is a query entry or an execute job entry in decision block 322. If the job entry is a query entry, the "QUERY" branch of decision block 322 is taken, the launch controller determines the job status in block 332, the method continues in block 314 where the job controller returns the job status, and the method ends in block 316. If the job entry is an execute job entry, the "EXECUTE" branch of decision block 322 is taken and the job is scheduled to be executed in block 324. For example, job controller 186 can provide the job to data manager/scheduler 188 to execute the job. The log job is executed in block 326. A decision is made as to whether or not the execution of the log job yielded results in decision block 328. If not, the "NO" branch of decision block 328 is taken, the job status in updated and the system is rebooted in block 334, the method continues in block 314 where the job controller returns the job status, and the method ends in block 316. If the execution of the diagnostics yielded results, the "YES" branch of decision block 328 is taken, the results are uploaded to a location designated for the results in block 330, the job status in updated and the system is rebooted in block 334, the method continues in block 314 where the job controller returns the job status, and the method ends in block 316.

Returning to FIG. 1, in a particular embodiment, MC 180 operates to remotely launch log module 156, to obtain log information 158 from NIC 150, and to provide the results to management system 190. In a particular embodiment, the interaction with NIC 150 is job-based as described above for obtaining log information 134 from log module 152. In another embodiment, the interaction with NIC 150 is done in real time. Here, log module 156 operates to monitor the network traffic flowing in network data traffic path 152 to detect malicious data packets, the log module records the information in logs 158, and MC 180 retrieves the information and provides it to management system 190. Thus, MC 180 provides log module 156 with a list of malicious packet markers, such as malicious IP addresses, malicious MAC addresses, suspected suspicious port accesses, tags that indicate the presence of malicious code, or the like, and the log module performs the monitoring and provides information back to the MC 180 only when the log module detects suspicious activity. In another first embodiment, MC 180 can receives the list of malicious packet markers from management system 190 and information regarding the data packet flows in NIC 150, and the MC determines the presence of malicious packets and provides the information to the managed system.

In another embodiment, INC 150 operates to launch log module 156, to obtain log information 158 from NIC 150, and to provide the results to a remote monitoring site via network 195. In a particular embodiment, log module 156 operates to monitor the network traffic flowing in network data traffic path 152 to detect malicious data packets, the log module records the information in logs 158, and the remote monitoring site retrieves the information. Here, NIC 150 provides a secure access to NVRAM 154 to the remote monitoring site, such that the remote monitoring site can securely upload the list of malicious packet markers to the NIC and can securely retrieve the log information from the NIC.

Figure 4:
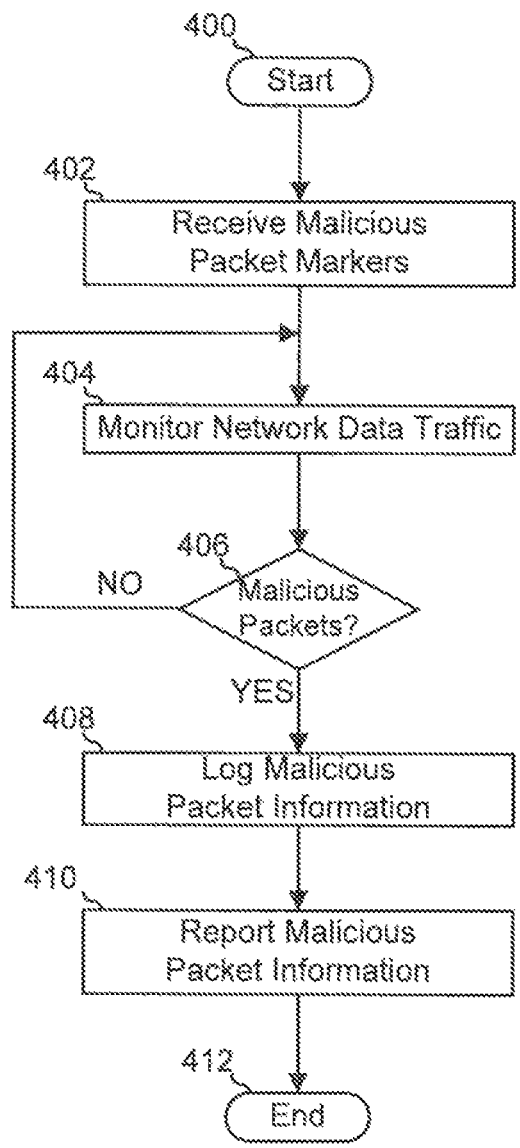

FIG. 4 illustrates a method for tamper resistant reliable logging of network traffic in a managed system starting at block 400. A list of malicious packet markers is received by a NIC in block 402. The NIC monitors to detect the malicious packet markers in the network data traffic passing through the NIC in block 404. A decision is made as to whether or not the network data traffic includes malicious packets in decision block 406. If not, the "NO" branch of decision block 406 is taken and the method returns to block 404, where the NIC continues to monitor to detect the malicious packet markers. If the network data traffic includes malicious packets, the "YES" branch of decision block 406 is taken and information about the malicious packets is logged in block 408. The malicious packet information is reported in block 410, and the method ends in block 412.

Figure 5:
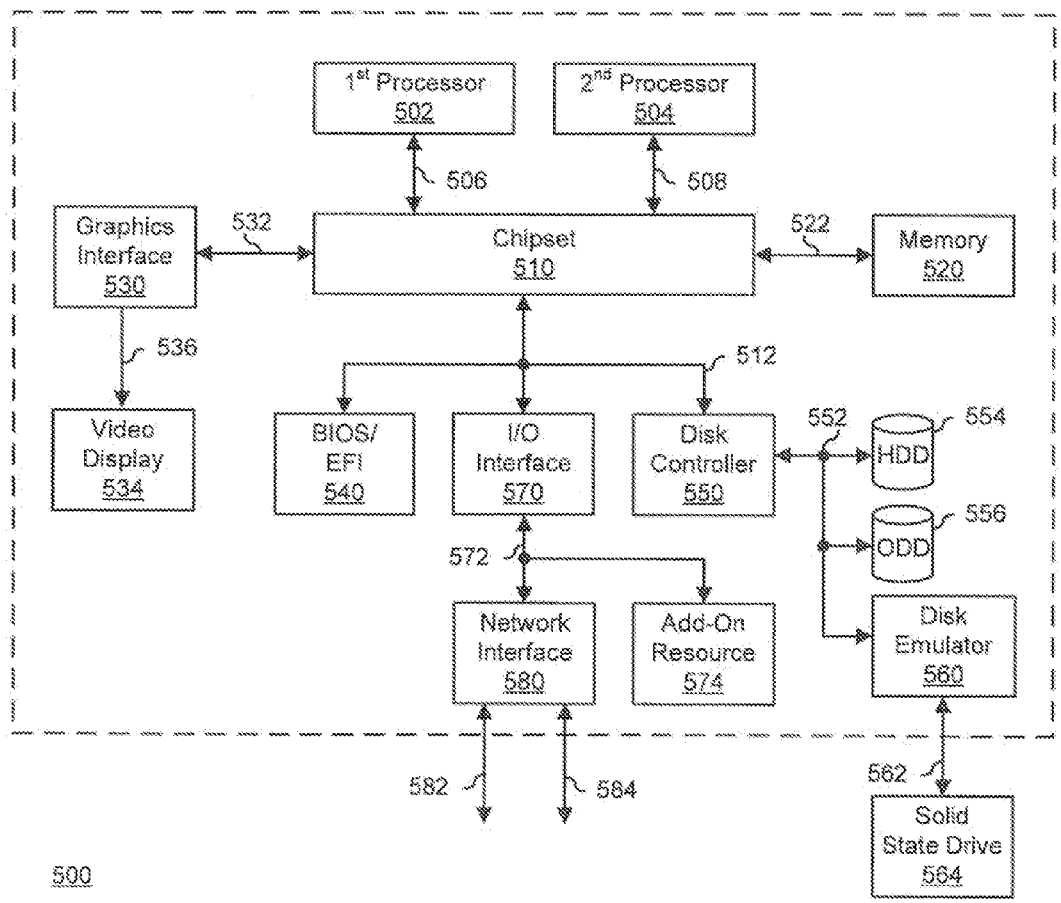
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network interface device comprising:
    a first communication interface coupled to an information handling system;
    a second communication interface coupled to a management controller;
    a network port coupled to a network;
    a memory including first code and second code; and
    a processor operable to execute the first code to communicate network data packets between the first communication interface and the network port, and to execute the second code to:
        launch a log module in response to a command from the management controller;
        receive, by the log module, a malicious packet marker from the information handling system;
        store, by the log module, the malicious packet marker to the memory;
        receive, by the log module, a job entry from a management system separate from the management controller, wherein the job entry is received via the management controller via the second communication interface; and
        in response to receiving the job entry, to:
            monitor, by the log module, the network data packets flowing between the first communication interface and the network port;
            determine, by the log module, that a packet matches the malicious packet marker;
            store, by the log module, log information from the packet to the memory in response to determining that the packet matches the malicious packet marker; and
            send, by the log module, the log information to the management controller via the second communication interface.

2. The network interface device of claim 1, wherein the second communication interface comprises a Reduced Media Independent Interface.

3. The network interface device of claim 1, wherein the malicious packet marker is received via the network port.

4. The network interface device of claim 3, wherein the processor is further operable to send the log information to the network via the network port.

5. The network interface device of claim 1, wherein the malicious packet marker is received from a log module of the information handling system.

6. The network interface device of claim 5, wherein the processor is further operable to send the log information to the log module of the information handling system.

7. The network interface device of claim 1, wherein the second code is isolated from the information handling system.

8. The network interface device of claim 1, wherein the malicious packet marker is received via the second communication interface.

9. A method comprising:
    communicating, by a network interface device, network data packets between a first communication interface of a network interface device and a network port of the network interface device;
    launching, by a launch controller of a management controller, a log module on the network interface device, wherein the management controller is coupled to the network interface device via a second communication interface;
    receiving, by the log module, a malicious packet marker;
    storing, by the log module, the malicious packet marker in a memory of the network interface device;
    receiving, by the management controller, a job entry from a management system external to the management controller;
    sending, by the launch controller, the job entry to the log module; and
    in response to sending the job entry:
        monitoring, by the log module, network data packets flowing between the first communication interface and the network port;
        determining, by the log module, that a packet matches the malicious packet marker;
        storing, by the log module, log information from the packet to the memory in response to determining that the packet matches the malicious packet marker;
        sending the log information to the management controller via the second communication interface; and
        sending, by the log module, the log information to the management system.

10. The method of claim 9, wherein the second communication interface comprises a Network Communication Service Interface.

11. The method of claim 9, wherein malicious packet marker is received via the network port.

12. The method of claim 11, further comprising:
    sending the log information to the network via the network port.

13. The method of claim 9, wherein the malicious packet marker is received from a log module of the information handling system.

14. The method of claim 13, further comprising:
    sending the log information to the log module of the information handling system.

15. The method of claim 9, wherein the malicious packet marker is received via the second communication interface.

16. A non-transitory computer-readable medium including code for performing a method, the method comprising:
    communicating network data packets between a first communication interface of a network interface device and a network port of the network interface device;
    launching, by a launch controller of a management controller, a log module on the network interface device, wherein the management controller is coupled to the network interface device via a second communication interface;
    receiving, by the log module, a malicious packet marker via the first communication interface;
    storing, by the log module, the malicious packet marker in a memory of the network interface device;
    receiving, by the management controller, a job entry from a management system external to the management controller; and sending, by the launch controller, the job entry to the log module; and in response to receiving the job entry:
- monitoring, by the log module, network data packets flowing between the first communication interface and the network port;
- determining, by the log module, that a packet matches the malicious packet marker;
- storing, by the log module, log information from the packet to the memory in response to determining that the packet matches the malicious packet marker;
- sending, by the log module, the log information to the management controller via the second communication interface; and
- sending, by the log module, the log information to the management system.

17. The computer readable medium of claim 16, wherein the malicious packet marker is received via the second communication interface.

* * * * *